United States Patent [19]

Wachter et al.

[11] Patent Number: 4,937,399

[45] Date of Patent: Jun. 26, 1990

[54] METHOD FOR ISOMERIZING WAX TO LUBE BASE OILS USING A SIZED ISOMERIZATION CATALYST

[75] Inventors: William A. Wachter, Baton Rouge, La.; Ian A. Cody, Clearwater, Canada; Glen P. Hamner, deceased, late of Baton Rouge, La., by Annabelle Hamner, executrix; Biddanda U. Achia, Clearwater, Canada

[73] Assignee: Exxon Research and Engineering Company, Florham Park, N.J.

[21] Appl. No.: 283,680

[22] Filed: Dec. 13, 1988

Related U.S. Application Data

[63] Continuation-in-part of Ser. No. 134,697, Dec. 18, 1987, abandoned.

[51] Int. Cl.$^5$ .............................. C07C 5/13
[52] U.S. Cl. ........................ 585/749; 585/751; 585/752; 208/115
[58] Field of Search ............... 585/749, 751, 752; 208/115

[56] References Cited

U.S. PATENT DOCUMENTS

| | | | |
|---|---|---|---|
| 2,668,790 | 2/1954 | Good et al. | 208/20 |
| 2,668,866 | 2/1954 | Good et al. | 208/18 |
| 2,817,693 | 12/1957 | Koome et al. | 208/46 |
| 2,838,444 | 6/1958 | Teter et al. | 208/138 |
| 2,914,464 | 11/1959 | Burton et al. | 208/138 |
| 3,078,323 | 2/1963 | Kline et al. | 585/737 |
| 3,121,696 | 2/1964 | Hoekstra | 502/230 |
| 3,123,573 | 3/1964 | Carr | 502/230 |
| 3,125,511 | 3/1964 | Tupman et al. | 208/264 |
| 3,206,525 | 9/1965 | Michaels et al. | 585/740 |
| 3,268,439 | 8/1966 | Tupman | 208/112 |
| 3,308,052 | 3/1967 | Ireland et al. | 208/27 |
| 3,365,390 | 1/1968 | Egan et al. | 208/60 |
| 3,486,993 | 12/1969 | Egan et al. | 208/89 |
| 3,487,005 | 12/1969 | Egan et al. | 208/59 |
| 3,629,096 | 12/1971 | Divijak | 208/89 |
| 3,684,695 | 8/1972 | Neel et al. | 208/110 |
| 3,692,697 | 9/1972 | Kravitz | 502/220 |
| 3,709,817 | 1/1973 | Suggitt et al. | 208/112 |
| 3,711,399 | 1/1973 | Estes et al. | 208/112 |
| 3,717,586 | 2/1973 | Suggitt | 502/220 |
| 3,794,580 | 2/1974 | Ladeur | 208/110 |
| 3,830,723 | 8/1974 | Ladeur et al. | 208/108 |
| 3,843,746 | 10/1974 | Kravitz et al. | 585/749 |
| 3,864,425 | 2/1975 | Gardner | 260/683.68 |
| 3,915,843 | 10/1975 | Franck et al. | 208/112 |
| 4,186,078 | 1/1980 | Itoh et al. | 208/27 |
| 4,263,127 | 4/1981 | Rausch et al. | 208/58 |
| 4,472,529 | 9/1984 | Johnson et al. | 502/228 |
| 4,695,365 | 9/1987 | Ackelson et al. | 208/89 |

FOREIGN PATENT DOCUMENTS

| | | |
|---|---|---|
| 539698 | 4/1957 | Canada . |
| 700237 | 12/1964 | Canada . |
| 954058 | 9/1974 | Canada . |
| 823010 | 11/1959 | United Kingdom . |
| 848198 | 9/1960 | United Kingdom . |
| 1065205 | 4/1967 | United Kingdom . |
| 1342499 | 1/1974 | United Kingdom . |
| 1342500 | 1/1974 | United Kingdom . |
| 1429494 | 3/1976 | United Kingdom . |
| 1493928 | 11/1977 | United Kingdom . |

Primary Examiner—Curtis R. Davis
Attorney, Agent, or Firm—Joseph J. Allocca

[57] ABSTRACT

The present invention is directed to a process for the catalytic isomerization of waxes to liquid products, particularly to the production of high yields of liquid products boiling in the 370° C.+ range suitable for use as lube oil base stocks or blending stocks, said process employing as the catalyst a material made by depositing a hydrogenation metal component on a refractory metal oxide base, preferably alumina, fluoriding said metal loaded base using aqueous HF and subsequently crushing the fluorided metal loaded base to produce a sized material of 1/32 inch and less its largest cross-sectional dimension. Alternately the catalyst can be made by depositing a hydrogenation metal component on a refractory metal oxide base of 1/32 inch and less across its largest cross-sectional dimension and subsequently fluoriding said sized material using aqueous HF. In either case the catalyst is activated before being used by heating in a hydrogen atmosphere to from 350° C. to 500° C. for from 1 to 48 hours or more.

14 Claims, No Drawings

4,937,399

METHOD FOR ISOMERIZING WAX TO LUBE BASE OILS USING A SIZED ISOMERIZATION CATALYST

CROSS REFERENCE TO RELATED APPLICATIONS

This is a continuation-in-part application of U.S. Ser. No. 134,697, filed Dec. 18, 1987 and now abandoned.

FIELD OF THE INVENTION

The present invention is directed to a process for the catalytic isomerization of waxes to liquid products, particularly to the production of high yields of liquid products boiling in the 370° C.+ range suitable for use as lube oil base stocks or blending stocks, said process employing as the catalyst a material made by depositing a hydrogenation metal component on a refractory metal oxide base, preferably alumina, fluoriding said metal loaded base using HF and subsequently crushing the fluorided metal loaded base to produce a sized material of 1/32 inch and less across its largest cross-sectional dimension. Alternately the catalyst can be made by depositing a hydrogenation metal component on a refractory metal oxide base of 1/32 inch and less across its largest cross-sectional dimension and subsequently fluoriding said sized material using HF. In either case the catalyst is activated before being used by heating in a hydrogen atmosphere to from 350° C. to 500° C. for from 1 to 48 hours or more.

DESCRIPTION OF THE INVENTION

A process is disclosed of the production of high yields of non-conventional lube oil base stocks or blending stocks by the isomerization of waxes over isomerization catalysts containing a hydrogenating metal component typically one from Group VIII or mixtures thereof, preferably Group VIII, more preferably noble Group VIII, most preferably platinum on a halogenated refractory metal oxide support. The catalyst typically contains from 0.1 to 5.0 weight percent metal, preferably 0.1 0.1 to 1.0 weight percent metal, most preferably 0.2 to 0.6 weight percent metal. The refractory metal oxide support is typically an alumina and the halogen is fluorine. The catalyst has a halogen content in the range of 2 to 10 weight percent halogen, preferably 2 to 8 weight percent halogen. The catalyst employed in the present process which results in the production of high yields of isomerate is taught in copending application U.S. Ser. No. 283,658, filed even date herewith, which is a continuation-in-part of U.S. Ser. No. 134,698, filed Dec. 18, 1987, and now abandoned, in the names of Cody, Hamner, Sawyer and Schorfheide and consists of a hydrogenating metal on halogenated refractory metal oxide support made by depositing the hydrogenation metal on the refractory metal oxide support and fluoriding said metal-loaded support using acidic fluorine sources such as HF by any convenient technique such as spraying, soaking, incipient wetness, etc. to deposit between 2 to 10 percent, preferably 2 to 8 percent. Following fluorination, the catalyst is dried typically at 120° C. and then crushed to expose inner surfaces, the crushed catalyst hereinafter called "sized" catalyst. This sized catalyst will typically be 1/32 inch and less across its longest cross-sectional dimension and will preferably range from 1/64 inch to 1/32 inch across its largest cross-sectional dimension. Alternatively the catalyst is made by depositing the hydrogenation metal on the refractory metal oxide base, having particle sizes of 1/32 inch and less across its largest cross-sectional dimension and preferably in the range between 1/64 to 1/32 inch across its largest cross-sectional dimension and subsequently fluoriding said sized metal loaded base using a low pH fluorine source such as aqueous HF.

The particle or extrudate is sized to expose inner surfaces of the particle or extrudate. The starting particle or extrudate may be of any physical configuration. Thus, particles such as trilobes or quadrilobes may be used. Extrudates of any diameter may be utilized, and can be anywhere from 1/32 of an inch to many inches in length, the length dimension being set solely by handling considerations. It is preferred that following sizing the particle be smaller than the initial size of the starting extrudate.

Following deposition of the hydrogenation metal and the halogenation of the particle of extrudate, the particle or extrudate is sized or fractured to expose inner surfaces. Alternatively, the hydrogenation metal can be loaded into a particle which is already 1/32 inch or less across its largest cross-sectional dimension (in which case additional crushing and sizing is not necessary) followed by fluoriding or a larger particle can be loaded with the hydrogenated metal, then crushed and sized to a size about 1/32 inch or less across its largest cross-sectional dimension, followed by fluoriding.

The sizing is conducted to an extent appropriate to the particle or extrudate with which one is starting. Thus, an extrudate of 1/16 inch across its largest cross-sectional dimension would be sized into pieces which range between about 1/64 to 1/32 inch across its largest cross-sectional dimension. If the extrudate is only 1/16 inch to begin with it will be enough simply to fracture it to produce a crushed material less than about 1/32 inch.

Following sizing, the uncalcined sized catalyst is activated by heating in a hydrogen atmosphere at a temperature of 350° C. to 500° C. for from 1 to 48 hours or more. The atmosphere may be pure hydrogen or plant hydrogen (60 to 70 vol % hydrogen).

A typical activation profile shows a period of 2 hours to go from room temperature to 100° C. with the catalyst being helf at 100° C. from 0 to 2 hours, then the temperature is raised from 100° to about 350° C. over a period of 1 to 3 hours with a hold at the final temperature of from 1 to 4 hours. Alternatively, the catalyst can be activated by heating from room temperature to the final temperature of 350° to 450° C. over a period of 2 to 7 hours with a hold at the final temperature of 0 to 4 hours. Similarly, activation can be accomplished by going from room temperature to the final temperature of 350° to 450° C. in 1 hour.

In small pilot units, sizing down of particles is practiced to improve catalyst-liquid feed contacting and minimize back mixing of partially converted product and feed. Particle sizing can lead to improved catalyst performance because of improved hydrodynamics especially if the system is A→B→C where B (in this case oil) is the desired product. However, in this case we have found that the improvement caused by sizing the particles exceeds the benefits normally associated simply from better contacting. We have the benefit of high mass velocity operation (2,000 lb/ft$^2$/h) data to establish performance at plant scale (i.e. no hydrodynamic limitations) using unsized particles. Small scale operation (approximately 100 lb/ft$^2$/h) using sized particles gives higher yields than is achieved at plant scale mass velocities using unsized extrudates.

This sized catalyst is unexpectedly superior for wax isomerization as compared to the uncrushed particle or extrudate starting material. It has also been discovered that 370° C.+ oil products made using the sized catalyst starting with wax possessing about 5 to 10 percent oil exhibit higher VI's than do 370° C.+ oil products made starting with wax possessing either 0 percent oil or 20 percent oil. Therefore, to produce products having the highest VI one would isomerize wax having from 5 to 15 percent oil, preferably 7 to 10 percent oil.

The wax which is isomerized may come from any of a number of sources such as waxes recovered from the solvent or autorefrigeration dewaxing of conventional hydrocarbon oils, as well as mixtures of these waxes. Waxes from dewaxing conventional hydrocarbon oils are commonly called slack waxes and usually contain an appreciable amount of oil. The oil content of these slack waxes can range any where from 0 to 45 percent or more, usually 1 to 30 percent oil. For the purposes of this application, the waxes are divided into two categories: (1) light paraffinic waxes boiling in the range about 300° to 580° C.; and (2) heavy microwaves having a substantial fraction ($\geq 50$ percent) boiling above 600° C.

As one would expect, isomerization catalysts are extremely susceptible to deactivation by the presence of heteroatom compounds (i.e., N or S compounds) in the wax feed, so care must be exercised to remove such heteroatom materials from the wax feed charges. Waxes obtained from natural petroleum sources contain quantities of oil which contain heteroatom compounds. In such instances, the slack waxes should be hydrotreated to reduce the level of heteroatoms compounds to levels commonly accepted in the industry as tolerable for feeds to be exposed to isomerization catalysts. Such levels will typically be a nitrogen content of 1 to 5 ppm and a sulfur content of 1 to 20 ppm, preferably 2 ppm or less nitrogen, and 5 ppm or less sulfur. Similarly, such slack waxes should be deoiled prior to hydrotreating to an oil content in the range of 1 to 35 percent oil, preferably 1 to 25 percent oil, more preferably 5 to 15 percent oil, most preferably 7 to 10 percent oil. The hydrotreating step will employ typical hydrotreating catalyst such as Co/Mo or Ni/Mo on alumina under standard, commercially accepted conditions, e.g. temperature of 280° to 400° C., space velocity of 0.1 to 2.0 V/V/hr, pressure of from 500 to 3,000 psig $H_2$ and hydrogen gas rates of from 500 to 5,000 SCF/B.

Isomerization is conducted under conditions of temperatures between about 270° to 400° C., preferably 300° to 360° C., pressures of 500 to 3,000 psi $H_2$, preferably 1,000 to 1,500 psi $H_2$, hydrogen gas rates of 1,000 to 10,000 SCF/bbl, and a space velocity in the range of 0.1 to 10 V/V/hr, preferably 1 to 2 V/V/hr.

As is taught in copending application U.S. Ser. No. 283,664, filed even date herewith, which is a continuation-in-part of U.S. Ser. No. 135,150, filed Dec. 18, 1987, and now abandoned, in the names of Cody, Bell, West, Wachter and Achia, it is preferred that the isomerization reaction be conducted to a level of conversion such that about 40 percent and less, preferably 15 to 35 percent, most preferably 20 to 30 percent, unconverted wax remains in the fraction of the isomerate boiling in the lubes boiling range sent to the dewaxing unit. The fraction of unconverted wax is calculated as unconverted wax/(unconverted wax+ dewaxed oil) X100. The amount of unconverted wax in the 370° C.+ oil fraction is taken to be the amount of wax removed or recovered from said oil fraction upon dewaxing. The total product from the isomerization unit is fractionated into a lube oil fraction boiling in the 330° C.+ range, preferably in the 370° C.+ range or even higher. This lube oil fraction is solvent dewaxed, preferably using 20/80 v/v mixture of MEK/MIBK, and unconverted wax is recycled for further isomerization by being fed either to the fresh feed reservoir or directly to the isomerization unit.

In principle a wax extinction process for maximizing lube yields would involve operation at a very low severity i.e. where conversion to fuels is at a minimum. Under these circumstances the amount of unconverted wax recycled to the isomerization reactor would be large and differences in catalyst selectivity would be less important.

In practice, however, it is not practical to operate in a low conversion mode. Instead, the operating severity is governed by the need to make a low pour ($\leq -21°$ C. pour point) oil. It has been discovered that low pours cannot be achieved from isomerates made at low conversion. As is taught in copending application U.S. Ser. No. 283,664, this is unexpected since with natural oils the amount of wax present did not effect the ability to dewax the oil to low target pour point. A critical determinant in reaching low pours is that the amount of wax remaining in the 370° C.+ fraction obtained from isomerization should not exceed 40% and for lower pour points may have to be as little as 15-20%. To maximize yield in this situation the choice of catalyst becomes important.

Following isomerization the isomerate is fractionated into a lubes cut and fuels cut, the lubes cut being identified as that fraction boiling in the 330° C.+ range, preferably the 370° C.+ range or even higher. This lubes fraction is then dewaxed. Dewaxing is accomplished by techniques which permit the recovery of unconverted wax, since in the process of the present invention this unconverted wax is recycled for further isomerization. It is preferred that this recycled wax be sent to the feed wax reservoir and passed through the hydrotreating unit to remove any quantities of entrained dewaxing solvent, which solvent could be detrimental to the isomerization catalyst. Alternatively, a separate stripper can be used to remove entrained dewaxing solvent or other contaminants. Since the unconverted wax is to be recycled, dewaxing procedures which destroy the wax such as catalytic dewaxing are not recommended. Solvent dewaxing is utilized and employs typical dewaxing solvents. Solvent dewaxing utilizes typical dewaxing solvents such as $C_3$ to $C_6$ ketones (e.g. methyl ethyl ketone, methyl isobutyl ketone and mixtures thereof), aromatic hydrocarbons (e.g. toluene), mixtures of ketones and aromatics (e.g. MEK/toluene), autorefrigerative solvents such as liquified, normally gaseous $C_2$ to $C_4$ hydrocarbons such as propane, butane and mixtures thereof, etc. at filter temperature of $-25$ to $-30°$ C.

As is also taught in copending application U.S. Ser. No. 283,664, the preferred solvent to dewax the isomerate under miscible conditions and thereby produce the highest yield of dewaxed oil at a high filter rate is a mixture of MEK/MIBK (20/80) used at a temperature in the range $-25°$ to $-30°$ C. Pour points lower than $-21°$ C. can be achieved using lower filter temperatures and other ratios of said solvent, but a penalty is paid due to operation under immiscible conditions, the penalty being lower filter rates. Further, when dewaxing isomerate made from a microwax, e.g. Bright Stock slack wax, it has been found to be preferred that the fraction of the isomerate which is dewaxed is the "broad heart cut" identified as the fraction boiling between about 330° to 600° C., preferably about 370° to 580° C. The heavy bottoms fraction contains appreciable wax and can be recycled for further isomerization by being sent to the isomerization unit directly, or if any hydrotreating or deoiling is deemed necessary or desirable then the fractionation bottoms may be sent to the fresh feed reservoirs and combined with the wax therein.

One desiring to maximize the production of lube oil having a viscosity in the 5.6 to 5.9 cSt/100° C. range should practice the isomerization process under low hydrogen treat gas rate conditions, treat gas rates on the order of 500 to 5,000 SCFH$_2$/bbl, preferably 2,000 to 4,000 SCFH$_2$/bbl, most preferably about 2,000 to 3,000 SCFH$_2$/bbl, as is taught in copending application U.S. Ser. No. 283,684, filed even date herewith, which is a continuation-in-part of U.S. Ser. No. 134,998, filed Dec. 18, 1987, and now abandoned, in the name of H. A. Boucher.

It has also been found that prior to fractionation of the isomerate into various cuts and dewaxing said cuts the total liquid product (TLP) from the isomerization unit can be advantageously treated in a second stage at mild conditions using the isomerization catalyst or simply noble Group VIII on refractory metal oxide catalyst to reduce PNA and other contaminants in the isomerate and thus yield an oil of improved daylight stability. This aspect is covered in copending application U.S. Ser. No. 283,659, filed even date herewith, which is a continuation-in-part of U.S. Ser. No. 135,149, filed Dec. 18, 1987, and now abandoned, in the names of Cody, MacDonald, Eadie and Hamner.

In that embodiment the total isomerate is passed over a charge of the isomerization catalyst or over just noble Group VIII on transition alumina. Mild conditions are used, e.g. a temperature in the range of about 170° to 270° C., preferably about 180° to 220° C., at pressures of about 300 to 1,500 psi H$_2$, preferably 500 to 1,000 psi H$_2$, a hydrogen gas rate of about 500 to 10,000 SCF/bbl, preferably 1,000 to 5,000 SCF/bbl and a flow velocity of about 0.25 to 10 V/V/hr, preferably about 1 to 4 V/V/hr. Higher temperatures than those recited may be employed if pressures in excess of 1,500 psi are used, but such high pressures may not be practical.

The total isomerate can be treated under these mild conditions in a separate, dedicated unit or the TLP from the isomerization reactor can be stored in tankage and subsequently passed through the aforementioned isomerization reactor under said mild conditions. It has been found to be unnecessary to fractionate the first stage product prior to this mild second stage treatment. Subjecting the whole product to this mild second stage treatment produces an oil product which upon subsequent fractionation and dewaxing yields a base oil exhibiting a high level of daylight stability and oxidation stability. These base oils can be subjected to subsequent hydrofinishing using conventional catalysts such as KF-840 or HDN-30 (e.g. Co/Mo or Ni/Mo on alumina) under conventional conditions to remove undesirable process impurities.

This invention will be better understood by reference to the following examples which either demonstrate the invention or are offered for comparison purposes.

EXAMPLE 1

Catalyst 1 (Catalyst of the Invention)

Catalyst 1 was a 14/35 meshed platinum on fluorided alumina catalyst made by fluoriding a commercially available 1/16 inch alumina extrudate which contained 0.6 wt. % platinum and 1 wt. % chlorine as received from the manufacturer. Fluoriding was accomplished using an 11.6 wt % aqueous solution HF (by soaking), after which the fluorided metal loaded extrudate was washed with 10-fold excess water and dried at 150° C. in vacuum oven. It was then crushed to produce particles of about 1/30 inch (14/35 mesh). This sized material, catalyst 1 was activated by heating to 450° C. in 50 psi flowing H$_2$ in the following manner: room temperature to 100° C. in 2 hours, hold at 100° C. for 1 hour; heat from 100° C. to 450° C. in 3 hours; hold at 450° C. for 1 hour. The catalyst had a fluoride content of 8.3 wt. %. This catalyst was used to isomerize a slack wax derived from 600N oil to three levels of conversion.

The slack wax feed was first hydrotreated over HDN-30 catalyst (a conventional Ni/Mo on alumina catalyst) at 350° C., 1.0 V/V/hr, 1,500 SCF/bbl, H$_2$, 1,000 psi (H$_2$). The catalyst had been on stream for 1,447 to 1,577 hours. The hydrotreated slack wax had sulfur and nitrogen contents of less than 1 ppm and contained about 23% oil.

TABLE 1

| Isom Conditions | | | |
|---|---|---|---|
| Pressure, psi H$_2$ | 1,000 | 1,000 | 1,000 |
| Space Velocity (V/V/hr) | 0.9 | 0.9 | 0.9 |
| Gas Treat Rate (SCF/bbl, H$_2$) | 5,000 | 5,000 | 5,000 |
| Temperature, °C. | 318 | 324 | 327 |
| Catalyst Time on Stream (hrs) | 2,257–2,559 | 2,045–2,243 | 1,801–2,041 |
| Conversion Level, % 370° C.− | 11.8 | 20 | 25.8 |
| Feed to Dewaxing Cloud, °C. | 60 | 54 | 49 |
| Constant Dewaxing Conditions (Batch Conditions) | | | |
| Solvent | | 100% MIBK | |
| Dilution Solvent/Feed/V/V | 6.1 | 3.5 | 3.4 |
| Filter Temperature, °C. | −25 | −25 | −25 |
| Viscosity, CST @ 100° C. | 5.96 | 5.08 | 4.79 |
| Dewaxed Oil Properties | | | |
| Pour Point, °C. | −14 | −19 | −23 |
| Pour-Filter DT °C. | 11 | 6 | 2 |
| Viscosity, CST @ 40° C. | 27.6 | 22.8 | 20.7 |
| Viscosity, CST @ 100° C. | 5.63 | 5.03 | 4.61 |
| Viscosity Index | 149 | 147 | 144 |
| Wt % Wax Recovered from 370° C.+ Oil Fraction | 56 | 39 | 30 |

From this it is seen that even for isomerates obtained by isomerizing waxes from a natural petroleum source, the ability to dewax the isomerate to the desired low pour point of at least about −21° C. is dependent upon the level of conversion. Low conversion levels produce isomerate which cannot be dewaxed to a low target pour using conventional dewaxing solvents under typical dewaxing filter temperature conditions.

EXAMPLE 2

In the following runs the isomerate was made from slack wax obtained by solvent dewaxing a 600N oil. The slack wax was hydrotreated over HDN-30 catalyst at 350° C., 1.0 V/V/hr. 1,500 SCF/bbl, H$_2$, 1,000 psi H$_2$ over KF-840 at 340° C., 0.5 V/V/hr, 1,000 psi, 1,500

SCF/bbl, $H_2$. These hydrotreated waxes had oil contents ranging from 21 to 23 percent sulfur ranging from 3 to 10 ppm and nitrogen $\leq 1$ ppm.

This wax feed was contacted with platinum on fluorided alumina catalysts produced in the following ways.

CATALYST 2

One sixteenth inch $\gamma$ alumina extrudates impregnated with platinum were obtained from the commercial supplier containing 0.6 weight percent platinum and 1 percent chlorine on the extrudate. The metal-loaded extrudate was then fluorided using a 10-fold excess of 11.6 wt % aqueous HF by immersion for 16 hours at ambient temperature. The resulting catalyst was washed with $H_2O$ and dried at 150° C. in vacuum for 16 hours. The fluoride content was 8.0 weight percent. The sample of catalyst 2 as charged to the 200 cc unit was activated in 300 psi $H_2$ as follows: heating from room temperature to 100° C. at 35° C./hr; hold at 100° C. for 6 hours; heat from 100° C. to 250° C. at 10° C./hr; hold at 250° C. for 12 hrs; heat to 400° C. at 10° C./hr, hold at 400° C. for 3 hrs. The sample of Catalyst 2 as charged to the 3600 cc unit was activated as follows: at 300 psi $H_2$ at 11 SCFH$_2$/-hr. per pound of catalyst, heat from room temperature to 100° C. at 10° C./hr; hold at 100° C. for 24 hrs; heat from 100° C. to 250° C. at 10° C. per hour; hold at 250° C. for 15 hours; then at 22 SCF $H_2$/hour per pound of catalyst, heat from 250° C. to 400° C. in 31 hours; hold at 400° C. for 3 hours.

Table 2 presents comparisons of Catalysts 1 and 2 on slack wax from 600N oil. Conditions are recited under which the catalysts were run.

Dewaxed oil yields were determined by using the test method ASTM D-3235 on the 370° C.+ fraction.

TABLE 2

| Catalyst | 2 | | | 1 |
|---|---|---|---|---|
| Unit* | (a) | (a) | (a) | (b) |
| Run | 1 | 2 | 3 | 4 |
| Cat Charge cc | 3,600 | 200 | 200 | 80 |
| Flow | Down | Up | Up | Down |
| Isom Conditions | | | | |
| Temperature °C. | 323 | 318 | 347 | 320 |
| Pressure (psi $H_2$) | 1,000 | 1,000 | 1,000 | 1,000 |
| LHSV (v/v/hr) | 1.0 | 1.0 | 0.9 | 0.9 |
| Gas Rate (SCFH$_2$/bbl) | 5,000 | 5,000 | 5,000 | 5,000 |
| Max 370° C.+ Oil Yield, wt % | 51.0 | 45.0 | 56.0 | 52.0 |
| (370° C.−). wt % | 29.0 | 29.0 | 29.0 | 22.0 |

*(a) continuous pilot unit.
(b) small lab unit.

This example demonstrates that the catalyst of the invention (the sized catalyst, catalyst 1) is unexpectedly superior to the extrudate form of the catalyst (catalyst 2) even when the extrudate is run at high mass velocity (run 1), where feed and catalyst contacting are excellent and back mixing is minimized. Therefore the unexpectedly better performance of Catalyst 1 is not simply due to hydrodynamics.

EXAMPLE 3

The presence of oil in the wax has been found to produce an enhanced viscosity index (VI) product as compared to oil-free wax when isomerization is performed utilizing the preferred "sized" catalyst, Catalyst 1 of Example 2. The amount of oil in the wax, must fall within a particular range previously described if this enhanced VI phenomenon is to be obtained.

Catalyst 1 was used to isomerize a slack wax obtained from 600N oil. The wax samples had oil contents of <1 percent, about 7 percent and about 23 percent. The wax containing less than about 1 percent oil was made by recrystallizing a 600N slack wax by warm-up deoiling, followed by hydrotreating. This 1 percent oil wax has 99 percent saturates, 0.8 percent aromatics and 0.2 percent polar compounds (as determined by silica gel separation). It had an initial boiling point of 382° C. and a 99 percent off boiling point of 588° C., as determined by GCD. Isomerized products were dewaxed to between −18° to −21° pour. Fractionation of the products showed that at the higher viscosity range the isomerate made from wax possessing about 7 percent oil exhibited an unexpected VI enhancement as compared to the other wax samples having <1 percent and 23 percent oil. This is to be compared with the results obtained using an extrudate Pt/F-Al$_2$O$_3$ catalyst made as follows.

CATALYST 3

One sixteenth inch $\gamma$ alumina extrudates impregnated with platinum were obtained from a commercial supplier containing 0.6 weight percent platinum and 1 percent chlorine. The metal-loaded extrudate was fluorided using a solution of NH$_4$F/HF at pH about 4 by soaking. The soaked material was washed, then dried and calcined for 2 hours at 400° C. in air (according to the procedure of copending application USSN 283,709 filed even date herewith which is a continuation-in-part of USSN 134,795 filed Dec. 18, 1987, and now abandoned, in the names of Cody, Sawyer, Hamner and Davis). Fluorine content was found to be 6.9 wt %. Catalyst was activated by heating in 50 pounds flowing $H_2$ as follows: room temperature to 100° C. in 2 hours, hold for 1 hour, 100° C. to 350° C. in 2 hours, hold for 1 hour.

Catalyst 3 was used to isomerize 600N slack waxes containing <1, 10.9 and 22 percent oil under conditions selected to achieve the levels of conversion indicated in Table 3. Comparing the result obtained using Catalyst 1 with those obtained using Catalyst 3, one sees that isomerization utilizing the meshed catalyst (Catalyst 1) exhibits an unexpected VI enhancement when the wax feed employed contains 7 percent oil.

TABLE 3

Example of Enhancement of VI Employing Waxes Having 0% Oil Using The Sized Catalyst, Catalyst 1

| Catalyst | Oil Content of Wax | Conversion to 370° C.− | Viscosity @ 100° C. | VI |
|---|---|---|---|---|
| 1 | <1 | 13 | 4.8 | 148 |
|   | 7 | 24 | 4.8 | 150 |
|   | 23 | 12.8 | 4.8 | 135 |
|   |   | 25.8 | 4.8 | 137 |
| 3 | <1 | 19.3 | 4.8 | 147 |
|   |   | 35.0 | 4.6 | 142 |
|   | 10.9 | 26.8 | 4.9 | 143 |
|   | 22 | 28.8 | 5.0 | 139 |
|   |   | 48.6 | 4.6 | 136 |

EXAMPLE 4

Slack wax from Bright Stock containing 15 percent oil was treated over Cyanamid's HDN-30 catalyst at 399° C., 0.5 V/V/hr, 1,000 psi $H_2$ and 1,500 SCF/B, $H_2$, yielding a hydrotreated slack wax with the following properties:

370° C.+ oil content 22.8 wt %
S = 3 ppm
N = <1 ppm
GCD % off at °C. ibp, 255
80%, 656

The hydrotreated slack wax was then isomerized over the sized catalyst (Catalyst 1) described in Example 1 to produce the following isomerate products:

| Product | A | B |
|---|---|---|
| Isomerization Conditions: | | |
| Temperature, °C. | 332 | 332 |
| Pressure, psi $H_2$ | 1,000 | 1,000 |
| Gas Rate, SCF/B, $H_2$ | 5,000 | 5,000 |
| LHSV Velocity, V/V/hr | 0.9 | 0.9 |
| Max 370° C.+ Oil Yield, (wt % on feed) (by ASTM D3235 method) | 54.6 | 54.9 |
| 370° C.− wt % | 28.4 | 27.6 |

The isomerate products A and B made from the Bright Stock slack wax were fractionated into a broad heart cut (from product A) and a narrow cut (from product B) and dewaxed using MEK/MIBK under conventional dilution chilling dewaxing conditions. This was a DILCHILL dewaxing operation run at 150 cm/sec. agitation top speed (2 inch agitator) at an outlet temperature of −13° C. Indirect chilling was then employed to get down to the filter temperature. Only when dealing with the broad heart cut fraction could low pour point, high yields and good filter rates be simultaneously achieved. From review of the data presented in Tables 4 and 4A, it is apparent that fractionating the isomerate into a heart cut boiling between 370° and 582° C. not only facilitated dewaxing the oil to the target pour point but permitted the dewaxing to be more efficient (i.e. higher filter rates) than with the narrow fraction. Higher yields of oil were obtained at good dewaxed oil filter rates on the broad heart cut as compared to narrow cut dewaxed under the same conditions. (Compare runs 1 and 2 with A and B.) This shows the advantage of dewaxing the broad heart cut when dealing with isomerate obtained from very heavy, high boiling wax fractions since operating on the heart cut permits dewaxing to be conducted under miscible conditions.

TABLE 4

Comparison of Narrow versus Broad Heart Cut Dilution Chilling Dewaxing Performance for Bright Stock Isomerates

| Boiling Range, °C.: | Broad Heart Cut 370–582 | | | | | |
|---|---|---|---|---|---|---|
| Run | 1 | 2 | 3 | 4 | 5 | 6 |
| Process Conditions | | | | | | |
| Solvent Type | MEK/MIBK | MEK/MIBK | MEK/MIBK | MEK/MIBK | MEK/MIBK | MEK/MIBK |
| Comp., V/V | 10/90 | 20/80 | 30/70 | 20/80 | 30/70 | 0/100 |
| Dilution, Solv/Feed, V/V | — | 4.3 | 4.1 | 4.1 | 4.3 | — |
| Filter Temperature, °C. | −25 | −25 | −30 | −35 | −35 | −25 |
| Miscibility | Miscible | Miscible | Borderline | Immiscible | Immiscible | Miscible |
| Wax Content, wt % | — | 21 | 23 | 25 | 25 | 21 |
| Theoretical DWO Yield (100-WC), wt % | — | 79 | 77 | 75 | 75 | 79 |
| Feed Filter Rate, M3/M2 Day | 3.8 | 3.8 | 4.2 | 3.7 | 4.8 | 3.4 |
| Wax Cake Liquids/Solids, W/W | 7.7 | 9.4 | 8.4 | 10.5 | 10.5 | 8.3 |
| Wash/Feed, W/W | — | 1.0 | 1.1 | 1.0 | 0.88 | — |
| % Oil in Wax | 22 | 42 | 37 | 56 | 66 | 33 |
| Dewaxed Oil Yield, wt % | 73.1 | 63.8 | 63.5 | 43.2 | 26.5 | 68.7 |
| Dewaxed Oil Filter Rate, M3/M2 Day | 2.8 | 2.6 | 2.6 | 1.6 | 1.3 | 2.3 |
| Dewaxed Oil Inspections | | | | | | |
| Viscosity, CST | | | | | | |
| @ 40° C. | 25.5 | 25.3 | 25.75 | 24.49 | 22.67 | 25.7 |
| @ 100° C. | 5.31 | 5.28 | 5.34 | 5.15 | 4.87 | 5.34 |
| Viscosity Index | 147 | 147 | 147 | 143 | 143 | 147 |
| Pour, °C. | −20 | −20 | −26 | −32 | −32 | −20 |
| Cloud, °C. | −17 | −17 | −22 | −31 | −31 | −16 |

TABLE 4A

Comparison of Narrow versus Broad Heart Cut Dilution Chilling Dewaxing Performance for Bright Stock Isomerates

| Boiling Range, °C.: | Narrow Cut 495–582 | | | | | Topped 370° C.+ |
|---|---|---|---|---|---|---|
| Run | A | B | C | D | E | 1 |
| Process Conditions | | | | | | |
| Solvent Type | MEK/MIBK | MEK/MIBK | MEK/MIBK | MEK/MIBK | MEK/MIBK | MEK/MIBK |
| Comp., V/V | 10/90 | 20/80 | 30/70 | 0/100 | 5/95 | 10/90 |
| Dilution, Solv/Feed, V/V | 4.3 | 4.5 | 3.9 | — | — | 4.2 |
| Filter Temperature, °C. | −25 | −25 | −25 | −25 | −25 | −25 |
| Miscibility | Miscible/Borderline | Immiscible | Immiscible | Miscible | Borderline | Miscible/Borderline |
| Wax Content, wt % | 29 | 29 | 30 | — | — | 28 |
| Theoretical DWO Yield | 71 | 71 | 70 | — | — | 72 |

TABLE 4A-continued

Comparison of Narrow versus Broad Heart Cut Dilution
Chilling Dewaxing Performance for Bright Stock Isomerates

| Boiling Range, °C.: Run | Narrow Cut 495-582 | | | | | Topped 370° C.+ |
|---|---|---|---|---|---|---|
| | A | B | C | D | E | I |
| (100-WC), wt % | | | | | | |
| Feed Filter Rate, M3/M2 Day | 3.2 | 3.8 | 6.6 | 3.1 | 3.0 | 2.9 |
| Wax Cake Liquids/Solids, W/W | 5.1 | 6.9 | 6.8 | 6.1 | 5.6 | 5.9 |
| Wash/Feed, W/W | 1.19 | 1.08 | 0.87 | — | — | — |
| % Oil in Wax | 18 | 52 | 62 | — | — | 24 |
| Dewaxed Oil Yield, wt % | 64.6 | 39.6 | 21.1 | 65.3 | 65.8 | 63.2 |
| Dewaxed Oil Filter Rate, M3/M2 Day | 2.1 | 1.5 | 1.4 | 2.0 | 2.0 | 1.8 |
| Dewaxed Oil Inspections Viscosity, CST | | | | | | |
| @ 40° C. | 56.1 | 51.3 | 49.6 | 48.7 | 53.6 | 34.9 |
| @ 100° C. | 9.18 | 8.83 | 8.63 | 8.37 | 9.13 | 6.63 |
| Viscosity Index | 145 | 152 | 152.5 | 148 | 152 | 148 |
| Pour, °C. | −20 | −21 | −22 | −15 | −15 | −20 |
| Cloud, °C. | −15 | −14 | −17 | — | — | −18 |

What is claimed is:

1. An improved method for producing lube oil base stock or blending stock by the isomerization of slack-wax under isomerization conditions said improvement comprising using a hydrogenation metal loaded halogenated refractory metal oxide catalyst made by depositing a Group VIII metal or mixture thereof on a particle extrudate refractory metal oxide support, fluoriding said metal loaded support to a fluorine level of 2 to 10 wt % using hydrogen fluoride solution, crushing said metal loaded halogenated refractory metal oxide support to expose inner surface thereof to produce a sized material having a particle size of about 1/32 inch and less across its largest cross-sectional dimension and activating said sized catalyst by heating to a temperature of 350° C. to 500° C. in a hydrogen atmosphere for from 1 to 48 hours or more.

2. An improved method for producing lube oil base stocks or blending stocks by the isomerization of slack waxes under isomerization conditions said improvement comprising using a hydrogen metal loaded fluorided refractory metal oxide catalyst made by depositing a Group VIII metal or mixture thereof on a particle extrudate refractory metal oxide support, having a particle size of less than about 1/32 inch across its largest cross-sectional dimension, fluoriding said metal loaded support to a fluorine level of 2 to 10 wt % using a hydrogen fluoride solution and activating said metal loaded fluorided material by heating in a hydrogen atmosphere to a temperature of about 350° C. to 500° C. from 1 to 48 hours or more.

3. The method of claim 1 or 2 wherein the hydrogenation metal component is a Group VIII metal.

4. The method of claim 3 wherein the hydrogenation metal component is a noble Group VIII.

5. The method of claim 1 or 2 wherein the refractory metal oxide is a transition alumina.

6. The method of claim 1 or 2 wherein the catalyst is sized and will range in particle size between about 1/64 to less than 1/32 inch across its largest cross-sectional dimension.

7. The method of claim 1 or 2 wherein the wax which is isomerized contains between about 5-15 percent oil.

8. The method of claim 1 or 2 wherein the isomerization reaction is conducted at a temperature between about 270° to 400° C., pressure of 500 to 3000 psi, $H_2$ gas rate of 1000 to 10,000 SCF/bbl and a space velocity of 0.1 to 10 v/v/hr.

9. The method of claim 1 or 2 wherein following isomerization the isomerate is fractionated in a fraction boiling in the lube oil range and this fraction is dewaxed.

10. The method of claim wherein following isomerization the isomerate is fractionated into a lube oil fraction boiling in the 330° C.+ range and the fraction is dewaxed.

11. The method of claim 9 wherein the unconverted wax recovered in the dewaxing step is recycled to be further isomerized.

12. The method of claim 10 wherein the fraction boiling above about 600° C. is recycled to be further isomerized.

13. The method of claim 7 wherein the isomerization reaction is conducted at a temperature between about 270° C. to 400° C., pressure of 500 to 3000 psi, $H_2$ gas rate of 1000 to 10,000 SCF/bbl, and a space velocity of 0.1 to 10 V/V/hr.

14. The method of claim 7 wherein following isomerization the isomerate is fractionated into a fraction boiling in the lube oil range and this fraction is dewaxed.

* * * * *